No. 634,822. Patented Oct. 10, 1899.
J. A. JAMIESON.
BEARING.
(Application filed Nov. 8, 1898.)
(No Model.)
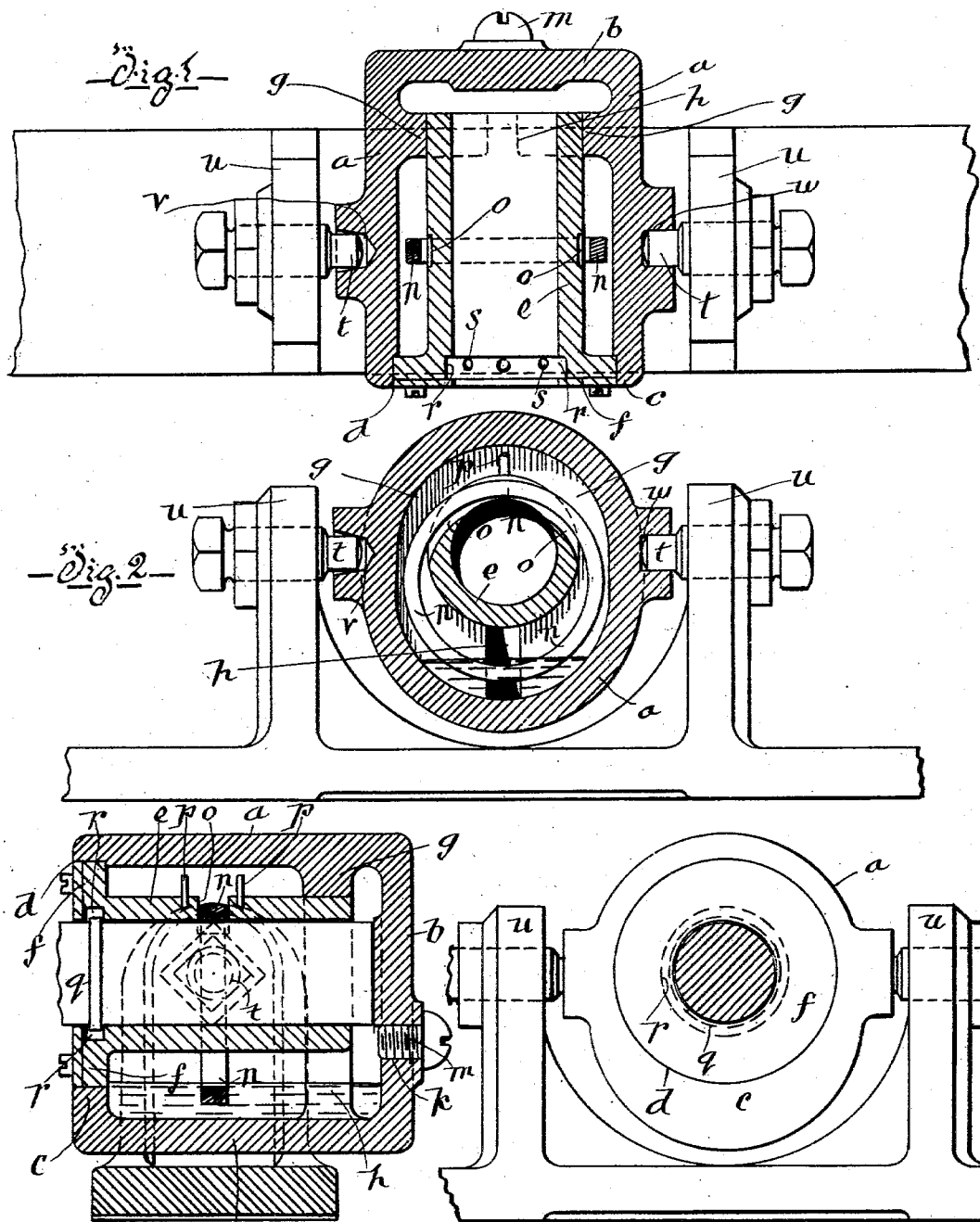
Witnesses
Inventor
James Alexander Jamieson
By his Attorney

UNITED STATES PATENT OFFICE.

JAMES ALEXANDER JAMIESON, OF MONTREAL, CANADA.

BEARING.

SPECIFICATION forming part of Letters Patent No. 634,822, dated October 10, 1899.

Application filed November 8, 1898. Serial No. 695,890. (No model.)

*To all whom it may concern:*

Be it known that I, JAMES ALEXANDER JAMIESON, of the city of Montreal, in the district of Montreal, Province of Quebec, Canada, have invented certain new and useful Improvements in Bearings; and I do hereby declare that the following is a full, clear, and exact description of the same.

This invention relates more particularly to bearings of the ring-oiling type, and has for its object to so construct such bearings as to render it impossible for dust to find entrance thereto or oil to escape therefrom, and also to allow of the perfect adjustment of the bearing to the shaft.

The invention comprises as important features, first, a bearing-casing in the form of a single piece or casting (as distinguished from the usual two halves) and adapted to receive within it a bushing and oiling-ring; secondly, an arrester device for preventing the escape of oil from within the bearing, and, thirdly, an arrangement of trunnion-supports and socket receiving the ends of such supports, whereby the bearings, whether in a stand or hanger, can be perfectly adjusted to the shaft, while other details of construction, arrangement, and combination are hereinafter fully described, and pointed out in the claims.

For full comprehension, however, of the invention reference must be had to the annexed drawings, forming a part of this specification, in which like symbols indicate corresponding parts, and wherein—

Figure 1 is a horizontal sectional view of a ring-oiling bearing containing my improvements, the stand in which it is carried remaining in plan view. Fig. 2 is a vertical transverse section of the same with the stand in elevation; Fig. 3, a vertical longitudinal section through bearing and stand, and Fig. 4 a front elevation of same.

I have preferred to illustrate my improvements as applied to a ring-oiling end bearing and stand, although they are equally applicable in bearings other than end bearings and whether supported in a stand or hanger, as will be readily obvious.

In the present example the casing is of a single piece or casting embracing an endless encircling wall $a$, presenting an oval cross-section, an end or rear wall $b$, integral with the encircling wall $a$ and completely closing up the rear end of the casing, and another end or front wall $c$, only partially closing the front end thereof. The top or edge of the front wall $c$ coincides with and forms part of the edge of a circular opening $d$ in the front end of the casing, such opening being concentric with the shaft and allowing of the introduction of the oiling-ring and a bushing or sleeve $e$ of less diameter than the inside space of the casing, but having an annular flange or enlargement $f$ at its front end adapted to fill up the space of the opening $d$ between the shaft and the casing. The rear end of the bushing $e$ is supported by an annular flange $g$, projecting from the inside face of the casing and completely encircling such bushing, except at the lower side of same, where an opening $h$ is left in the flange to allow of the passage of oil from an inlet $k$ (normally closed by a screw-plug $m$) in the rear wall $b$ to a point beneath the bushing where the oiling-ring can reach and travel through such oil. The oiling-ring $n$ is of slightly-less diameter than the front flange $f$ of the bushing or of the opening $d$, so that it can be readily passed through such front opening in the casing, and it is allowed to reach and rest upon the top of the shaft (so as to be rotated thereby) through a transverse slot $o$ in the bushing, a pair of guard-pins $p$ being, if desired, inserted in the bushing to prevent the ring getting out of place.

With the shaft in place in the bushing it will be noticed that a bearing is produced which is effectively closed at every point except the mere film, so to say, of space encircling the shaft at the opening in the bushing, thus effectively preventing any entry of dust. To guard against the escape of oil along the shaft, I arrest the oil at a point within the bushing near the front end by breaking the even continuity of the surface of the shaft through the agency of either an annular ridge or collar $q$, encircling the shaft, as shown, or an annular groove (not shown) cut in the shaft and causing the oil that reaches the inner face of the ring to be thrown by centrifugal force off the shaft radially outward into an annular groove $r$ in the bushing opposite the groove (not shown) in the shaft, but somewhat wider than the latter groove and communicating with the main oil-chamber through draining-holes s in the bushing.

To secure a perfect alinement or paralleling of the bearing with the shaft, I arrange that the usual adjustable trunnions or studs t, carried by the stand u, shall fit the one into a flaring socket v on one side of the casing and the other into a laterally-elongated socket w on the opposite side thereof, whereby in addition to rotary adjustment of the bearing upon the trunnion lateral adjustment may also be obtained.

What I claim is as follows:

1. The combination with a shaft or journal, of a bearing comprising a horizontally-arranged cylindrical casing having one end closed; a bushing located within said casing and having its outer end formed with a circumferential flange to close the open end of said casing, said bushing being transversely slotted and of sufficiently less length than the interior of said casing to provide a space between the inner end thereof and the closed end of the casing; an inwardly-projecting flange formed on the interior of the casing near the inner end thereof to support the inner end of said bushing and having an opening in the lower part thereof, and an oiling-ring resting through said slot, upon the shaft; substantially as described.

2. The combination with a shaft or journal, of a bearing comprising a horizontally-arranged cylindrical casing having one end closed; a bushing located within said casing and having its outer end formed with a circumferential flange to close the open end of said casing, said bushing being transversely slotted and of sufficiently less length than the interior of said casing to provide a space between the inner end thereof and the closed end of the casing; an inwardly-projecting flange formed on the interior of the casing near the inner end thereof to support the inner end of said bushing and having an opening in the lower part thereof, an oiling-ring resting through said slot, upon the shaft; a collar having a flat perimeter and formed in one with and encircling said shaft in the line with an annular groove formed in the bushing, substantially as described.

In testimony whereof I have affixed my signature in presence of two witnesses.

JAMES ALEXANDER JAMIESON.

Witnesses:
WILLIAM P. MCFEAT,
FRED J. SEARS.